United States Patent
Mueller et al.

(10) Patent No.: US 7,279,517 B2
(45) Date of Patent: Oct. 9, 2007

(54) PROCESS FOR THE ALKOXYLATION OF ORGANIC COMPOUNDS IN THE PRESENCE OF NOVEL FRAMEWORK MATERIALS

(75) Inventors: Ulrich Mueller, Neustadt (DE); Michael Stoesser, Neuhofen (DE); Raimund Ruppel, Dresden (DE); Eva Baum, Schwarzheide (DE); Edward Bohres, Mannheim (DE); Marcus Sigl, Mannheim (DE); Lisa Lobree, Philadelphia, PA (US); Omar M. Yaghi, Ann Arbor, MI (US); Mohamed Eddaoudi, Ann Arbor, MI (US)

(73) Assignees: BASF Aktiengesellschaft, Ludwigshafen (DE); University of Michigan, Ann Arbor, MI (US)

( * ) Notice: Subject to any disclaimer, the term of this patent is extended or adjusted under 35 U.S.C. 154(b) by 495 days.

(21) Appl. No.: 10/492,192

(22) PCT Filed: Oct. 18, 2002

(86) PCT No.: PCT/EP02/11700

§ 371 (c)(1),
(2), (4) Date: Apr. 19, 2004

(87) PCT Pub. No.: WO03/035717

PCT Pub. Date: May 1, 2003

(65) Prior Publication Data

US 2004/0249189 A1    Dec. 9, 2004

Related U.S. Application Data

(63) Continuation of application No. 10/039,733, filed on Oct. 19, 2001, now abandoned.

(51) Int. Cl.
*C08L 75/00* (2006.01)
*C07C 67/26* (2006.01)

(52) U.S. Cl. .................................. 524/199; 560/209

(58) Field of Classification Search .................. None
See application file for complete search history.

(56) References Cited

U.S. PATENT DOCUMENTS 3,144,418 A     8/1964     Hill et al.

FOREIGN PATENT DOCUMENTS

| DE | 44 08 772 | 9/1994 |
|---|---|---|
| DE | 101 43 195 | 3/2003 |
| WO | 00/78837 | 12/2000 |
| WO | 01/16209 | 3/2001 |
| WO | 01/27186 | 4/2001 |

OTHER PUBLICATIONS

S. Hayase, et al., "Polymerization of cyclohexene oxide with al(acac)$_3$-silanol catalyst supported by zeolite and porous silica", Journal of Polymer Science: Polymer Chemistry Edition, vol. 19, No. 10, pp. 2541-2550 1981.

Masakatsu Kuroki, et al., "(5,10, 15,20-Tetraphenyl-porphyrinato)manganese acetate as a novel initiator for the ring-opening polymerization of 1,2-epoxypropane", Makromolekulare Chemie, vol. 189, No. 6, pp. 1305-1313 Jun. 1, 1988.

H. Li, et al., "Design and synthesis of an exceptionally stable and highly porous metal-organic framework", NATURE, vol. 402, pp. 276-279 1999.

*Primary Examiner*—Paul A. Zucker
(74) *Attorney, Agent, or Firm*—Oblon, Spivak, McClelland, Maier & Neustadt, P.C.

(57) ABSTRACT

The present invention relates to a process for the alkoxylation of organic compounds comprising the reaction of at least one organic compound with at least one alkoxylating agent in the presence of a catalyst system, wherein a polyether alcohol is obtained. The catalyst system comprises a metallo organic framework mate-rial comprising pores and at least one metal ion and at least one at least bidentate organic compound, which is coordinately bounded to said metal ion. Furthermore it relates to polyurethanes or polyurethane foams, which are obtainable by using a prepared polyether alcohol as a starting material.

15 Claims, 2 Drawing Sheets

PROCESS FOR THE ALKOXYLATION OF ORGANIC COMPOUNDS IN THE PRESENCE OF NOVEL FRAMEWORK MATERIALS

This application is a 371 of PCT/EP02/11700, filed Oct. 18, 2002, which is a continuation of Ser. No. 10/039,733, filed Oct. 19, 2001, now abandoned.

The present invention relates to a process for the alkoxylation of organic compounds in the presence of catalyst systems comprising a metallo-organic framework material comprising pores and a metal ion and an at least bidentate organic compound, said bidentate organic compound being coordinately bound to the metal ion. The invention further encompasses an integrated process for preparing polyurethanes from isocyanate and polyether alcohol or modified polyether alcohols, which have been obtained by using the alkoxylation process according to the invention. Still further, the present invention is directed to polyurethanes being obtainable by the process according to the invention, as well as shaped bodies comprising the polyurethanes as prepared according to the invention.

The polyurethanes prepared according to the invention are particularly useful for the preparation of polyurethane foams, polyurethane cast skins and elastomers.

The characteristics of polyurethanes, such as mechanical properties and smell, are particularly strongly dependent upon the isocyanate and polyether alcohols, which are respectively used for their preparation, and optionally upon the used driving agents. Particularly the structure of the polyether alcohol has a strong influence on the characteristics of the obtained polyurethane. The properties of the polyether alcohols are in turn strongly influenced by their method of preparation and particularly by the characteristics and the process for preparation of the starting materials. A detailed discussion of the phenomena may be found in WO 01/7186 and DE 10143195.3 of the present applicant. As further prior art for preparing polyether alcohol, WO 01/16209 and WO 00/78837 are to be mentioned.

The reduction of the impurities within the preparation of polyether alcohols and/or polyurethanes is of high interest for various applications. The automotive and furniture industry request in increasing amounts polyurethanes, which possibly are free of emissions and smelling substances. According to the guideline of Daimler Chrysler denoted PB VWL 709 of Jan. 11, 2001 it is required that parts to be used inside of cars exhibit a maximum of 100 ppm for the emission of volatile substances and 250 ppm for condensable substances, respectively.

Impurities, which are present in polyurethanes also negatively influence the mechanical properties thereof. The impurities and side reactions in many cases lead to monofunctional products. The functionality of the polyetheroles and the mechanical properties of the polyurethanes, such as elongation, tear strength and hardness generally deteriorate.

Polyether alcohols may be prepared e.g. by way of base or acid catalyzed polyaddition of alkaline oxides to polyfunctional organic compounds (starters). Suitable starters are e.g. water, alcohols, acids or amines or mixtures of two or more thereof. These preparation methods are particularly disadvantageous in that several elaborate purifying steps are necessary in order to separate the catalyst residue from the reaction product. Furthermore, with increasing chain length of polyether polyols prepared, the content of mono-functional products and substances with intensive smell, which are not desired within polyurethane production, increases.

The reduction of the functionality is particularly disadvantageous for elastomers, since the used polyether alcohols should generally be bi-functional. Due to the mono-functional impurities within the polyether alcohol, the functionality decreases below 2, resulting in a significant deterioration of the mechanical characteristics of the polyurethanes, particularly tear strength and elongation.

The side products generated by side reactions within the base or acid catalyzed reaction are furthermore partly contained in the polyurethane as smelling impurities. Particularly to be mentioned are aldehydes, e.g. propionic aldehyde, cycloacetates, allylic alcohol and their reaction products. The automotive and furniture industry request in increasing amounts polyetheroles and polyurethanes having reduced or no smell.

An object of the invention is therefore to provide a process for the preparation of polyether alcohols and polyurethanes, respectively, which yields polyether alcohols and polyurethanes, respectively, having a low amount of impurities, particularly low molecular weight substances having intensive smell, which process does not comprise elaborate purifying steps of starting materials and/or intermediate products.

Figure 1:
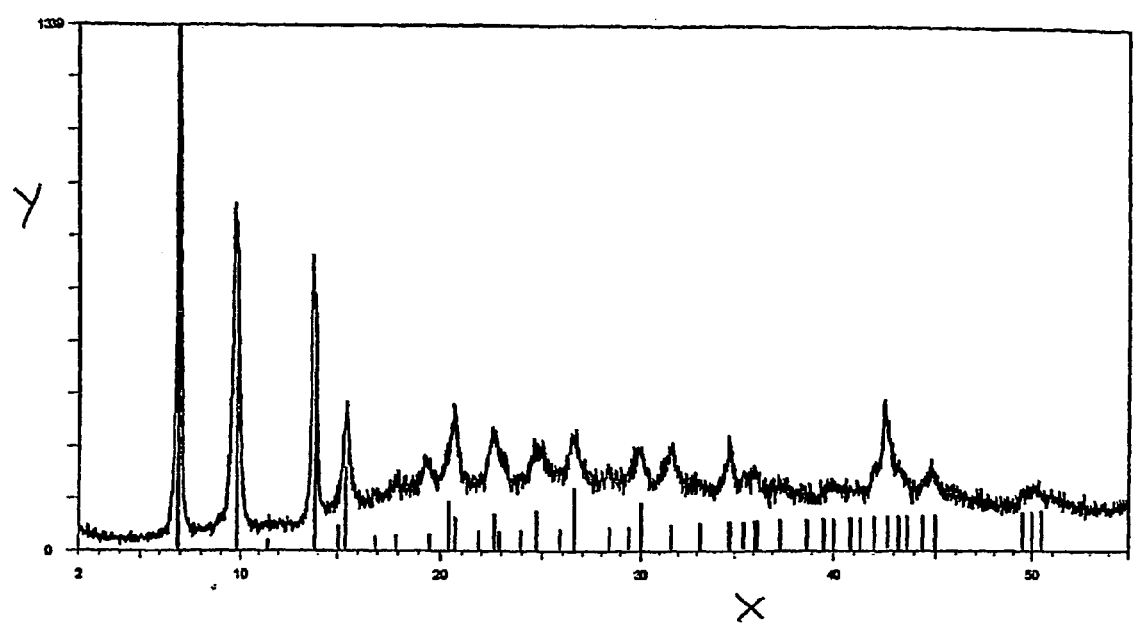
FIG. 1 shows a X-ray powder diffractogramm of the MOF-5 catalyst as prepared according to Example 1 (the ordinate Y describes Lin in Counts and the abscisse X the 2-Theta-Scale).

This object is solved by a process for the alkoxylation of organic compounds comprising the reaction of at least one organic compound, which is capable of being alkoxylated, with at least one alkoxylating agent in the presence of a catalyst system, wherein a polyether alcohol is obtained. This process is characterized in that the catalyst system comprises a metallo-organic framework material comprising pores and at least one metal ion and at least one at least bidentate organic compound, which is coordinately bound to said metal ion. Furthermore it is solved by an integrated process for the preparation of a polyurethane comprising at least the following steps:

(2) reacting at least one organic compound, which is capable of being alkoxylated, with at least one alkoxylating agent via a process as described above, wherein a polyether alcohol is obtained;

(3) reacting the polyether alcohol of step (2) with at least one isocyanate.

As the alkoxylating agent in step (2) preferably mono- or multifunctional expoxide having two to 30 carbon atoms or mono- or multifunctional polyester polyoles having a molar mass of above 600 g/mol or a mixture of two or more thereof are used. Particularly, substituted or unsubstituted alkylene oxides having two to 24 C-atoms, e.g. alkylene oxides having halogen, hydroxy, non-cyclic ether or ammonium substitutents are used.

As suitable compounds, the following are exemplarily to be mentioned: ethylene oxide, 1,2-epoxypropane, 1,2-methyl-2-methylpropane, 1,2-epoxybutane, 2,3-epoxybutane, 1,2-methyl-3-methylbutane, 1,2-epoxypentane, 1,2-methyl-3-methylpentane, 1,2-epoxyhexane, 1,2-epoxyheptane, 1,2-epoxyoctane, 1,2-epoxynonane, 1,2-epoxydecane, 1,2-epoxyundecane, 1,2-epoxydodecane, 1,2-epoxycyclopentane, 1,2-epoxycyclohexane, (2,3-epoxypropyl)benzene, vinyloxirane, 3-phenoxy-1,2-epoxypropane, 2,3-epoxymethyl ether, 2,3-epoxyethyl ether, 2,3-epoxyisopropyl ether, 2,3-epoxyl-1-propanol, (3,4-epoxybutyl)stearate, 4,5-epoxypentylacetate, 2,3-epoxy propane methacrylate, 2,3-epoxy propane acrylat, glycidylbutyrate, methylglycidate, ethyl-2,3-epoxybutanoate, 4-(trimethylsilyl)butane-1,2-epoxide, 4-(triethylsilyl)butane-1,2-epoxide, 3-(perfluoromethyl)propane oxide, 3-(perfluoroethyl)propane oxide, 3-(perfluorobutyl)propane oxide, 4-(2,3-epoxypropyl)morpholine, 1-(oxirane-2-ylmethyl)pyrrolidin-2-one, and mixtures of two or more thereof.

Particularly to be mentioned are: aliphatic 1,2-alkylene oxide having 2 to 4 C-atoms, such as ethylene oxide, 1,2-butylene oxide, 2,3-butylene oxide or isobutylene oxide, aliphatic 1,2-alkylene oxides having 5 to 24 C-atoms, cycloaliphatic alkylene oxide, such as cyclopentane oxide, cyclohexane oxide or cyclododecatriane-(1,5,9)-monoxide, araliphatic alkylene oxide, e.g. styrene oxide.

Particularly preferred are within the present invention ethylene oxide, propylene oxide, 1,2-epoxybutane, 2,3-epoxybutane, styrene oxide, vinyloxirane and any mixtures of two or more thereof within each other, particularly ethylene oxide, propylene oxide and mixtures of ethylene oxide, 1,2-epoxypropane.

As polyether alcohols, within the present invention, particularly polyester polyoles and modified polyetheroles are used, which are obtainable by using ethylene oxide or propylene oxide, which may be prepared according to step (1), preferably according to an embodiment outlined hereinunder. Subsequently, step (1) of the present invention is exemplarily described in detail by use of propylene oxide as an example:

Generally, propylene oxide may be obtained by reacting propylene with oxygen; hydrogen and oxygen; hydrogen peroxide; organic hydroperoxides; or halohydrines, preferably by reacting propylene with hydrogen peroxide, more preferred by reacting propylene with hydrogen peroxide in the presence of a catalyst comprising a zeolithic material, particularly by reacting propylene with hydrogen peroxide in the presence of a catalyst comprising a titanium-containing zeolithic material having CS-1-structure.

As a particularly suitable hydroperoxide for the epoxidation according to step (1), hydrogen peroxide is to be mentioned. This can be either prepared outside the reaction according to (1) or by starting from hydrogen and oxygen in situ within the reaction according to (1), respectively.

Thus, the present invention also relates in a preferred embodiment to a process for the alkoxylation of organic compounds and an integrated process for preparing a polyurethane, respectively, wherein the hydroperoxide as used in step (1) is hydrogen peroxide.

The epoxidation according to step (1) is in principle known from e.g. DE 100 55 652.3 and further patent applications of the present applicant, such as DE 100 32 885.7, DE 100 32 884.9, DE 100 15 246.5, DE 199 36 547.4, DE 199 26 725.1, DE 198 47 629.9, DE 198 35 907.1, DE 197 23 950.1, which are fully encompassed within the content of the present application with respect to their respective content. By the epoxidation according to step (1), propylene oxide is obtained in high purity. Particularly, the propylene oxide as such obtained exhibits a content of $C_6$-compounds of <1 ppm.

Within the present invention, as C6-compounds e.g. the following compounds are understood: 2-methylpentane, 4-methylpentene-1, n-hexane, hexenes, such as 1-hexene, and components having 6 C-atoms and in addition thereto one or more functional groups selected among the class of aldehydes, carboxylic acids, alcohols, ketones and ethers. Further undesired impurities are propane derivatives, particularly chlorinated propane derivatives, acetaldehyde, propione aldehyde, acetone, dioxolanes, allylic alcohol, pentane, methylpentane, furane, hexane, hexene, methoxypropane and methanol.

The propylene oxide obtained according to step (1) may further comprise as further side components, up to 100 ppm, particularly up to 40 ppm, methanol and up to 10 ppm, preferably up to 4 ppm, acetaldehyde.

Compared to other known methods for preparing propylene oxide, which are not excluded from the present application, and which are e.g. described in Weissermel, Arpe "Industrielle Organische Chemie", publisher VCH, Weinheim, 4$^{th}$ Ed., pages 288 to 318, the preferred embodiments of step (1) according to the invention yields propylene oxide having only minor impurities of $C_6$-components and contain no chloro-organic impurities.

A summary of the above-referenced prior art and the procedure when preparing polyether alcohols starting from propylene oxide is given in DE 10143195.3.

With regard to the preparation of ethylene oxide, which may also serve as an alkoxylating agent and which may also be prepared prior to conducting the process for the alkoxylation of an organic compound being capable of being alkoxylated, is e.g. broadly disclosed in U. Onken, Anton Behr, "Chemische Prozesskunde", Vol. 3, Thieme, 1996, pages 303 to 305 and Weissermel, Arpe "Industrial Organic Chemistry", 5$^{th}$ Ed., Wiley, 1998, pages 159 to 181.

Within the reaction yielding the polyether alcohols, the alkoxylating agent obtained according to step (1), particularly propylene oxide, may be directly used in the reaction according to step (2). It is, however, also possible within the present invention that the alkoxylating agent, particularly propylene oxide, yielded according to step (1) is beforehand treated, e.g. purified. As the purification method, mention can be made of a fine distillation. Suitable processes are e.g. disclosed in EP-B 0 557 116.

The alkoxylating agent as obtained according to step (1), particularly propylene oxide, may be used within the present invention alone or together with at least one further alkoxylating agent, particularly together with at least one further alkylene oxide.

For preparing a polyether alcohol according to step (2), it is possible within the present invention to use instead of or besides propylene oxide all alkoxylating agents, particularly alkylene oxides, which are known to the person skilled in the art, particularly the above-mentioned compounds.

In cases where, besides the alkoxylating agent obtained according to step (1), particularly propylene oxide, at least one further alkoxylating agent, particularly a further alkylene oxide is used, it is possible within the present invention that a mixture of the alkoxylating agent as obtained according to step (1), particularly propylene oxide, and at least one further alkoxylating agent, particularly alkylene oxide, is employed. It is, however, also possible within the present invention that the alkoxylating agent as obtained according to step (1), particularly propylene oxide, and the at least one further alkoxylating agent, particularly an alkylene oxide, are added subsequently.

The polyether alcohols as obtained according to step (2) may e.g. comprise also block structures. The structure of the polyether alcohols may be controlled in wide ranges by appropriate reaction conditions. Suitable reaction conditions for the reaction according to step (2) are e.g. disclosed in WO 99/16775.

The polyether alcohols as obtained according to step (2) may be modified for the reaction according to step (3). Regarding these modified polyether alcohols, particularly to be mentioned are grafted polyether polyoles, particularly those which are prepared by polymerizing styrene and acrylonitril in the presence of polyetheroles; polyurea dispersions (PHD-polyoles) which are prepared by reacting diisocyanates and diamines in the presence of polyetheroles; and polyisocyanate polyaddition polyoles (PIPA polyoles), which are prepared by reacting diisocyanates and amino alcohols in the presence of polyetheroles.

The reaction according to step (2) is carried out in the presence of a catalyst system.

The catalyst system as used according to the invention in step (2) comprises a metallo-organic pore containing framework material, which in turn comprises a metal ion and an at least bidentate organic compound, said bidentate organic compound being coordinately bound to the metal ion. Such catalyst systems are known as such and described in e.g. U.S. Pat. No. 5,648,508, EP-A-0 709 253, J. Sol. State Chem., 152 (2000) p. 3-20, Nature 402 (1999), p. 276 seq., Topics in Catalysis 9 (1999), p. 105-111, Science 291 (2001), p. 1021-23. An inexpensive way for their preparation is the subject of DE 10111230.0. The content of the above-mentioned literature, to which reference is made herein, is fully incorporated in the content of the present application.

The metallo-organic framework materials, as used in the present invention, comprise pores, particularly micro- and/or mesopores, wherein micropores are defined as being pores having a diameter of 2 nm or below and mesopores being pores having a diameter in the range of above 2 nm to 50 nm, respectively, according to the definition in Pure Applied Chem. X, p. 71 seq., particularly p. 79 (1976). The presence of the micro- and/or mesopores may be monitored by sorption measurements for determining the capacity of the metallo-organic framework materials to take up nitrogen at 77 K according to DIN 66131, 66134. A type-I-form of the isothermal curve indicates the presence of micropores. In a preferred embodiment, the specific surface areas, as calculated according to the Langmuir model (DIN 66131, 66134) are preferably above 5 m$^2$/g, more preferably above 50 m$^2$/g, particularly above 500 m$^2$/g and may increase into the region of to above 2000 m$^2$/g.

As the metal component within the framework material as used according to the present invention, particularly to be mentioned are metal ions of elements of groups Ia, IIa, IIIa, IVa to VIIIa and Ib to VIb of the periodic system; among those particularly to be mentioned are Mg, Ca, Sr, Ba, Sc, Y, Ti, Zr, Hf, V, Nb, Ta, Cr, Mo, W, Mn, Re, Fe, Ru, Os, Co, Rh, Ir, Ni, Pd, Pt, Cu, Ag, Au, Zn, Cd, Hg, Al, Ga, In, Ti, Si, Ge, Sn, Pb, As, Sb, and Bi, more preferably Zn, Cu, Ni, Pd, Pt, Ru, Rh and Co. As metal ions of these elements, particularly to be mentioned are: $Mg^{2+}$, $Ca^{2+}$, $Sr^{2+}$, $Ba^{2+}$, $Sc^{3+}$, $Y^{3+}$, $Ti^{4+}$, $Zr^{4+}$, $Hf^{4+}$, $V^{4+}$, $V^{3+}$, $V^{2+}$, $Nb^{3+}$, $Ta^{3+}$, $Cr^{3+}$, $Mo^{3+}$, $W^{3+}$, $Mn^{3+}$, $Mn^{3+}$, $Mn^{2+}$, $Re^{3+}$, $Re^{2+}$, $Fe^{3+}$, $Fe^{2+}$, $Ru^{3+}$, $Ru^{2+}$, $Os^{3+}$, $Os^{2+}$, $Co^{3+}$, $Co^{2+}$, $Rh^{2+}$, $Rh^{+}$, $Ir^{2+}$, $Ir^{+}$, $Ni^{2+}$, $Ni^{+}$, $Pd^{2+}$, $Pd^{+}$, $Pt^{2+}$, $Pt^{+}$, $Cu^{2+}$, $Cu^{+}$, $Ag^{+}$, $Au^{+}$, $Zn^{2+}$, $Cd^{2+}$, $Hg^{2+}$, $Al^{3+}$, $Ga^{3+}$, $In^{3+}$, $Tl^{3+}$, $Si^{4+}$, $Si^{2+}$, $Ge^{4+}$, $Ge^{2+}$, $Sn^{4+}$, $Sn^{2+}$, $Pb^{4+}$, $Pb^{2+}$, $As^{5+}$, $As^{3+}$, $As^{+}$, $Sb^{5+}$, $Sb^{3+}$, $Sb^{+}$ and $Bi^{5+}$, $Bi^{3+}$, $Bi^{+}$.

With regard to the preferred metal ions and further details regarding the same, we particularly refer to: EP-A 0 790 253, particularly p. 10, l. 8-30, section "The Metal Ions", which section is incorporated herein by reference.

As the at least bidentate organic compound, which is capable to coordinate with the metal ion, in principle all compounds which are suitable for this purpose and which fulfill the above requirements of being at least bidentate, may be used. The organic compound must have at least two centers, which are capable to coordinate with the metal ions of a metal salt, particularly with the metals of the aforementioned groups. With regard to the at least bidentate organic compound, specific mention is to be made of compounds having i) an alkyl group substructure, having from 1 to 10 carbon atoms, ii) an aryl group substructure, having from 1 to 5 phenyl rings, iii) an alkyl or aryl amine substructure, consisting of alkyl groups having from 1 to 10 carbon atoms or aryl groups having from 1 to 5 phenyl rings, said substructures having bound thereto at least one at least bidentate functional group "X", which is covalently bound to the substructure of said compound, and wherein X is selected from the group consisting of $CO_2H$, $CS_2H$, $NO_2$, $SO_3H$, $Si(OH)_3$, $Ge(OH)_3$, $Sn(OH)_3$, $Si(SH)_4$, $Ge(SH)_4$, $Sn(SH)_3$, $PO_3H$, $AsO_3H$, $AsO_4H$, $P(SH)_3$, $As(SH)_3$, $CH(RSH)_2$, $C(RSH)_3$, $CH(RNH_2)_2$, $C(RNH_2)_3$, $CH(ROH)_2$, $C(ROH)_3$, $CH(RCN)_2$, $C(RCN)_3$, wherein R is an alkyl group having from 1 to 5 carbon atoms, or an aryl group consisting of 1 to 2 phenyl rings, and $CH(SH)_2$, $C(SH)_3$, $CH(NH_2)_2$, $C(NH_2)_2$, $CH(OH)_2$, $C(OH)_3$, $CH(CN)_2$ and $C(CN)_3$.

Particularly to be mentioned are substituted or unsubstituted, mono- or polynuclear aromatic di-, tri- and tetracarboxylic acids and substituted or unsubstituted, aromatic, at least one hetero atom comprising aromatic di-, tri- and tetracarboxylic acids, which have one or more nuclei.

A preferred ligand is 1,3,5-benzene tricarboxyllic acid (BCT), particularly preferred metal ions are $Co^{2+}$ and $Zn^{2+}$.

Besides the at least bidentate organic compound, the framework material as used in accordance with the present invention may also comprise one or more mono-dentate ligands, which are preferably derived from the following mono-dentate substances:

a. alkyl amines and their corresponding alkyl ammonium salts, containing linear, branched, or cyclic aliphatic groups, having from 1 to 20 carbon atoms (and their corresponding ammonium salts);

b. aryl amines and their corresponding aryl ammonium salts having from 1 to 5 phenyl rings;

c. alkyl phosphonium salts, containing linear, branched, or cyclic aliphatic groups, having from 1 to 20 carbon atoms;

d. aryl phosphonium salts, having from 1 to 5 phenyl rings;

e. alkyl organic acids and the corresponding alkyl organic anions (and salts) containing linear, branched, or cyclic aliphatic groups, having from 1 to 20 carbon atoms;

f. aryl organic acids and their corresponding aryl organic anions and salts, having from 1 to 5 phenyl rings;

g. aliphatic alcohols, containing linear, branched, or cyclic aliphatic groups, having from 1 to 20 carbon atoms;

h. aryl alcohols having from 1 to 5 phenyl rings;

i. inorganic anions from the group consisting of:
sulfate, nitrate, nitrite, sulfite, bisulfite, phosphate, hydrogen phosphate, dihydrogen phosphate, diphosphate, triphosphate, phosphate, phosphite, chloride, chlorate, bromide, bromate, iodide, iodate, carbonate, bicarbonate, and the corresponding acids and salts of the aforementioned inorganic anions, j. ammonia, carbon dioxide, methane, oxygen, ethylene, hexane, benzene, toluene, xylene, chlorobenzene, nitrobenzene, naphthalene, thiophene, pyridine, acetone, 1-2-dichloroethane, methylenechloride, tetrahydrofuran, ehtanolamine, triethylamine and trifluoromethylsulfonic acid.

Further details regarding the at least bidentate organic compounds and the mono-dentate substances, from which the ligands of the framework material as used in the present application are derived, may be deduced from EP-A 0 790 253, whose respective content is incorporated into the present application by reference.

Particularly preferred are within the present application framework materials of the kind described herein, which comprise $Zn^{2+}$ as a metal ion and ligands derived from teraphthalic acid as the bidentate compound, which are known as MOF-5 in the literature.

Further metal ions and at least bidentate organic compounds and mono-dentate substances, which are respectively useful for the preparation of the framework materials used in the present invention as well as processes for their preparation are particularly disclosed in EP-A 0 790 253, U.S. Pat. No. 5,648,508 and DE 10111230.0.

As solvents, which are particularly useful for the preparation of MOF-5, in addition to the solvents disclosed in the above-referenced literature dimethyl formamide, diethyl formamide and N-methylpyrollidone, alone, in combination with each other or in combination with other solvents may be used. Within the preparation of the framework materials, particularly within the preparation of MOF-5, the solvents and mother liquors are recycled after crystallization in order to save costs and materials.

The separation of the framework materials, particularly of MOF-5, from the mother liquor of the crystallization may be achieved by procedures known in the art such as solid-liquid separations, such as centrifugation, extraction, filtration, membrane filtration, cross-flow filtration, flocculation using flocculation adjuvants (non-ionic, cationic and anionic adjuvants) or by the addition of pH shifting additives such as salts, acids or bases, by flotation, spray-drying or spray granulation as well as by evaporation of the mother liquor at elevated temperature and/or in vacuo and concentrating of the solid.

The separated framework materials, particularly MOF-5 may be compounded, melted, extruded, co-extruded, pressed, spinned, foamed and granulated according to processes known within the processing of plastics, respectively.

In step (2) according to the invention, the alkoxylating agent, particularly propylene oxide from step (1) or a mixture of propylene oxide of step (1) and at least one further alkylene oxide is reacted with an organic alkoxylatable compound (organic compound).

Within the present invention, in principle all organic compounds, which can be alkoxylated, may be used. As particularly suitable organic compounds, the following are to be mentioned:

water, organic mono- or dicarboxylic acids, such as acrylic acid, methacrylic acid, succenic acid, adipinic acid, phthalic acid and teraphthalic acid, aliphatic and aromatic, optionally N-mono-, N,N- and N,N'-dialkyl-substituted diamine with 1 to 4 carbon atoms in the alkyl group, such as optionally mono- or dialkyl-substituted ethylenediamine, diethylenetriamine, triethylenetetramine, 1,3-propylenediamine, 1,3- or 1,4-butylenediamine, 1,2-, 1,3-, 1,4-, 1,5- and 1,6-hexamethylenediamine, phenylenediamines, 2,3-, 2,4- and 2,6-toluylenediamine and 4,4'-, 2,4'- and 2,2'-diamino-di-phenylmethane, alkanolamines, such as ethanolamine, N-methyl- and N-ethyl-ethanolamine, dialkanolamines, such as diethanolamine, N-methyl- and N-ethyl-diethanolamine, and trialkanolamines, such as triethanolamine, and ammonia and polyvalent alcohols, such as monoethyleneglycol, propandiol-1,2 and -1,3 diethyleneglykol, dipropyleneglycol, butanediol-1,4, hexanediol-1,6, glycerol, trimethylolpropane, pentaerythrit, sorbite and saccharose. As the preferred polyether polyalcohols, addition products ethylene oxide and/or propylene oxide and water, monoethyleneglycol, diethyleneglykol, propandiol-1,2, diproplyeneglycol, glycerol, trimethylolpropane, ethylendiamine, triethanolamine, pentaerythrit, sorbite and/or saccharose are used alone or in admixture with each other.

The organic compounds may also be used in the form of alkoxylates, particularly those having a molecular weight $M_w$ in the range of 62 to 15,000 g/mol.

Furthermore, also macromolecules having functional groups with active hydrogen atoms, such as hydroxyl groups, particularly those which are mentioned in WO 01/16209 may be used.

The polyether alcohols as obtained in step (2) may be reacted with isocyanates in step (3). Step (3) may be carried out directly after step (2). It is also possible that an additional step, particularly a purification step, may be carried out between step (2) and (3).

Within the present invention, one or more isocyanates may be used. Besides the polyether alcohols as obtained according to step (2) within the reaction according to step (3), further components having groups which are reactive towards isocyanates, particularly those having hydroxyl groups, may be additionally used.

As further OH-components, use can be made of e.g. polyesters, further polyethers, polyacetales, polycarbonates, polyesterethers, and similar compounds.

Suitable polyesterpolyoles may be prepared by reacting organic dicarboxylic acids having 2 to 23 carbon atoms, preferably aliphatic dicarboxylic acids having 4 to 6 carbon atoms, with polyvalent alcohols, preferably dioles, respectively having 2 to 12 carbon atoms, preferably 2 to 6 carbon atoms. As the dicarboxylic acids, the following may be preferably used:

succinic acid, glutaric acid, adipinic acid, suberic acid, azelaic acid, sebacinic acid, decanedicarboxylic acid, maleic acid, fumaric acid, phthalic acid, isophthalic acid and teraphthalic acid. The dicarboxylic acids may be used alone or in admixture with each other. Instead of the free dicarboxylic acid, also the corresponding dicarboxylic acid derivatives, such as dicarboxylic esters of alcohols having 1 to 4 carbon atoms or dicarboxylic acid anhydrides may be used. Examples for polyvalent alcohols are:

ethanediole, diethyleneglycol, 1,2- and 1,3-propanediole, dipropyleneglycol, 1,4-butanediole, 1,5-pentanediole, 1,6-hexanediole, 1,10-decanediole, 1,12-dodecanediole, glycerol and trimethylolpropane. Preferably used are ethanediole, diethyleneglycol, 1,4-butanediole, 1,5-pentanediole, 1,6-hexanediole, glycerol and/or trimethylolpropane. Furthermore, polyesterpolyoles made of lactones, e.g. caprolactone or hydroxy carboxylic acid, such as α-hxydroxycarpronic acid may be used. For the preparation of the polyesterpolyoles, the organic, e.g. aromatic or preferably aliphatic polycarboxylic acids and/or derivatives thereof may be reacted with the polyvalent alcohol in the absence of a catalyst or preferably in the presence of an esterifying catalyst. Preferably, the reaction is carried out in an inert atmosphere, e.g. in a nitrogen, carbon monoxide, helium, argon, etc. atmosphere. The whole reaction is carried out in a melt at temperatures from 150 to 250° C., preferably 180 to 220° C., optionally under reduced pressure, up to the desired acid number, which preferably is lower than 10, more preferably lower than 2. According to a preferred embodiment of this condensation reaction, the mixture to be esterified is first reacted up to an acid number of 80 to 30, preferably 40 to 30, under normal pressure and at the above-mentioned temperatures, and subsequently polycondensated at a pressure of lower than 500 mbar, preferably 50 to 150 mbar. As esterifying catalyst, mention can be made of e.g. Fe, Cd, Co, Pb, Zn, Sb, Mg, Ti and Sn catalysts in the form of metals, metal oxides or metal salts. However, the polycondensation may be also carried out in the liquid phase in the presence of a thinning and/or entraining agent, such as benzene, toluene, xylene or chlorobenzene, in order to azeotropically distillate the water generated during condensation. For the preparation of the polyesterpolyoles, the organic polycarboxylic acids and/or acid derivatives and the polyvalent alcohols are preferably polycondensated in molar ratios of 1:1.8, preferably 1:1.05 to 1:1.2. The obtained polyesterpolyoles exhibit preferably a functionality of 2 to 4, particularly 2 to 3 and a hydroxyl number of preferably 22 to 100 mg KOH/g. Furthermore, use can be made of compounds which are reactive towards isocyanates, such as dioles, trioles and/or polyoles having molecular weights of 60 to <400, such as aliphatic, cycloaliphatic and/or araliphatic dioles having 2 to 14, preferably 4 to 10 carbon atoms, such as ethyleneglycol, propoanediole-1,3, decanediole-1,10, o-, m-, p-dihydroxycyclohexane, diethyleneglycol, dipropylenglycol and preferably butanediole-1,4, hexanediole-1,6 and bis-(2-hydroxyethyl)-hydroquinone; triole, such as 1,2,4-, 1,3,5-trihydroxy cyclohexane, glycol and trimethylolproprane; and low molecular weight polyalkyleneoxides having hydroxyl groups, such as those obtained by reacting ethylene oxide and/or 1,2-propylene oxide with the above-mentioned dioles and/or trioles as an H-functional compound.

According to the present invention, the polyether alcohol of step (2) is reacted with at least one isocyanate. In principle, all isocyanates which are known to the person skilled in the art, may be used within the present invention. Particularly, the following are to be mentioned:

aromatic, araliphatic, aliphatic and/or cycloaliphatic organic isocyanates, preferably diisocyanates.

The following individual compounds are particularly to be mentioned:

alkylenediisocyanates having 4 to 12 carbon atoms in the alkylene group, such as 1,12-dodecanediisocyanate, 2-ethyltetramethylenediisocyanate-1,4,2-methylpentamethylenediisocyanate-1,5, tetramethylenediisocyanate-1,4, lysinesterdiisocyanate (LDI) and/or hexamethylenediisocyanate-1,6 (HDI); cycloaliphatic diisocyanates, such as cyclohexane-1,3- and 1,4-diisocyanate and arbitrary mixtures of these isomers, 2,4- and 2,6-hexahydrotoluylenediisocyanate and the respective mixtures of isomers, 4,4'-, 2,2'- and 2,4'-dicyclohexylmethanediisocyanate and the respective mixtures of isomers and/or 1-isocyanato-3,3,5-trimethyl-5-isocyanatomethylcyclohexane (IPDI).

Furthermore, the following isocyanates are exemplary to be mentioned:

2,4- and 2,6-toluyliendiisocyanate and the respective mixtures of isomers, 4,4'-, 2,4'- and 2,2'-diphenylmethanediisocyanate and the respective mixtures of isomers, mixtures of 4,4'- and 2,2'-diphenylmethanediisocyanates, polyphenylpolymethylene-polyisocyanates, mixtures of 4,4'-, 2,4'- and 2,2'-diphenylmethanediisocyanates and polyphenylpolymethylene-polyisocyanates (raw-MDI) and mixtures of raw-MDI and toluylendiisocyanates. Furthermore, mixtures comprising at least two of the above-mentioned isocyanates may also be used. Furthermore, modified isocyanates having isocyanurate, bouret, ester, urea, allophanate, carbodiimid, uretdione, and/or urethane groups (in the following also denoted urethane group modified) containing di- and/or polyisocyanates may be used.

Among those, the following individual compounds may be mentioned:

urethane group containing organic polyisocyanates having an NCO-content of 50 to 10 wt.-%, preferably 35 to 15 wt.-%, relative to the total weight, such as 4,4'-diphenylmethanediisocyanate, 4,4'- and 2,4'-diphenylmethanediisocyanate mixtures, raw-MDI or 2,4- and 2,6-toluylendiisocyanates, which are respectively modified, e.g. with low molecular weight dioles, trioles, dialkyleneglycoles, trialkyleneglycoles or polyoxyalkyleneglycoles having molecular weights of up to 6000, particularly molecular weights of up to 1500, may be used alone or in admixture with each other. As the di- or polyoxyalkyleneglycoles, which may in turn also be used alone or in admixture with each other, the following are to be mentioned:

diethylene- and dipropyleneglycol, polyoxyethylene-, polyoxypropylene- and polyoxypropylenepolyoxyetheneglycoles, -trioles and/or tetroles. Furthermore, prepolymers comprising NCO-groups, and respectively having NCO-contents of 25 to 3.5 wt.-%, preferably 21 to 14 wt.-%, respectively relative to the total weight, may be also used. These compounds are prepared from the above-described polyester- and/or preferably polyether polyoles and 4,4'-diphenylmethanediisocyanate, mixtures of 2,4'- and 4,4'-diphenylmethanediisocyanate, 2,4- and/or 2,6-toluylendiisocyanate or raw-MDI. Furthermore, use can also be made of liquid polyisocyanates containing carbodiimide groups, respectively having NCO-contents of 36.6 to 15, preferably 31 to 21 wt.-%, relative to the total weight, e.g. on the basis of 4,4'-, 2,4'- and/or 2,2'-diphenylmethanediisocyanate and/or 2,4- and/or 2,6-toluylendiisocyanate. The modified polyisocyanates may be mixed with each other or together with non-modified organic polyisocyanates, such as e.g. 2,4'-, 4,4'-diphenylmethanediisocyanate, raw-MDI, 2,4- or 2,6-toluylendiisocyanate. As modified isocyanates, preferably use is made of isocyanurate, biuret and/or urethane group modified aliphatic and/or cycloaliphatic diisocyanates, e.g. those which are already mentioned, which are provided with biuret and/or cyanurate groups according to known processes, and which comprise at least one, preferably at least two and more preferably at least three free isocyanate groups, respectively. The trimerization of the isocyanates for preparing isocyanates having isocyanurate groups may be carried out at common temperatures in the presence of known catalysts, such as phosphines and/or phosphorine derivatives, amines, alkali metal salts, metal compounds and/or Mannich bases. Furthermore, trimers of isocyanates containing isocyanurate groups are furthermore commercially available. Isocyanates having biuret groups may also be prepared according to generally known processes, e.g. by reacting the above-mentioned diisocyanates with water or diamines, wherein as an intermediate product, a urea derivative is formed. Isocyanates containing biuret groups are also commercially available.

The reaction according to step (3) is carried out under conditions known to the person skilled in the art. Suitable reaction conditions are described in e.g. Becker, Braun "Polyurethanes", Kunststoffhandbuch, Vol. 7, Carl Hanser, Munich, 3$^{rd}$ Ed., 1993, p. 139 to 193.

Optionally, within the reaction according to step (3), further, low molecular weight compounds may be added as additives. Such compounds may be chain extenders or stopping agents. Particularly useful for this purpose are e.g. primary amino compounds having 2 to about 20, e.g. 2 to about 12 C-atoms. As examples, the following are to be mentioned:

ethylamine, n-propylamine, i-propylamine, n-propylamin, sec.-propylamine, tert.-butylamine, 1-aminoisobutane, substituted amines having 2 to about 20 C-atoms, such as 2-(N,N-dimethylamino)-1-aminoethane, aminomercaptanes, such as 1-amino-2-mercaptoethane, diamines, aliphatic aminoalkohols having 2 to about 20, preferably 2 to about 12 C-atoms, such as methanolamine, 1-amino-3,3-dimethylpentane-5-ol, 2-aminohexane-2',2"-diethanolamine, 1-Amino-2,5-dimethylcyclohexane-4-ol, 2-aminopropanol, 2-aminobutanol, 3-aminopropanol, 1-amino-2-propanol, 2-amino-2-methyl-1-propanol, 5-aminopentanol, 3-aminomethyl-3,5,5-trimethylcyclohexanol, 1-amino-1-cyclopentane-methanol, 2-amino-2-ethyl-1,3-propandiole, aromatic-aliphatic or aromatic or aromatic-cycloaliphatic aminoalcohols having 6 to about 20 C-atoms, wherein as the aromatic structures heterocyclic ring systems or preferably isocyclic ring systems such as naphthalene or particularly benzene derivatives, such as 2-aminobenzylalcohol, 3-(hydroxymethyl)anilin, 2-amino-3-phenyl-1-propanol, 2-amino-1-phenylethanol, 2-phenylglycinol or 2-amino-1-phenyl-1,3-propandiole and mixtures of two or more of such compounds.

The reaction according to step (3) may optionally be carried out in the present of a catalyst. Compounds which are suitably used as catalysts may in principle be all compounds which strongly accelerate the reaction of isocyanates with compounds being reactive towards isocyanates, wherein preferably a total content of catalyst of from 0.001 to 15 wt.-%, particularly 0.05 to 6 wt.-%, relative to the total weight of compounds being reactive towards isocyanates is used. In the following, possibly used catalysts are exemplarily mentioned:

Tertiary amines, such as triethylamine, tributylamine, dimethylbenzylamine, dicyclohexylmethylamine, dimethylcyclohexylamine, N,N,N',N'-tetramethyldiaminodiethylether, bis(dimethylaminopropyl)urea, N-methyl- and N-ethylmorpholine, N-cyclohexylmorpholine, N,N,N',N'-tetramethylethylenediamine, N,N,N',N'-tetramethylbutanediamine, N,N,N',N'-tetramethylhexanediamine-1,6, pentamethyldiethylenetriamine, dimethylpiperazine, N-dimethylaminoethylpiperidine, 1,8-diazabicyclo(5.4.0)undecen-7,1,2-dimethylimidazol, 1-azabicyclo-(2.2.0)octane, 1,4-diazabicyclo(2.2.2)octan (DABCO), alkonolamine compounds, such as triethanolamine, triisopropanolamine, N-methyl- and N-ethyl diethanolamine, dimethylaminoethanol, 2-(N,N-dimethylaminoethoxy)ethanol, N,N,N',N"-tris(dialkylaminoalkyl)hexahydrotriazines, such as N,N',N"-tris(dimethylaminopropyl)-s-hexahydrotriazine, preferably triethylenediamine, pentamethylenediethylentriamin and/or bis(dimethylamino)ether; metal salts, e.g. inorganic and/or organic compounds of Fe, Pb, Zn and/or Sn, in common oxideation stages of the metals, respectively, such as Fe(II)-chloride, Zn-chloride, Pb-octoate and preferably Sn-compounds, such as Sn(II)-compounds, particularly Sn-dioctoate, Sn-diethylhexlmaleate and/or Sn(IV)-compounds, such as dialkyl-Sn-di(isooctylmercaptoacetate), dialkyl-Sn-di(2-ethylhexylmaleate), dialkyl-Sn-di(2-ethylhexylmercaptoacetate), dialkyl-Sn-di(isooctylmercaptoacetate), dialkyl-Sn-dilaurate, dialkyl-Sn-dimaleate, dialkyl-Sn-di (mercaptoacetate). Furthermore, amidines, such as 2,3-dimethyl-3,4,5,6-tetrahydropyrimidine, tetraalkylammonium hydroxides, such as tetramethylammonium hydroxide, alkali metal hydroxyides, such as sodium hydroxide and alkali metal alcoholates, such as sodium methylate and potassium isopropylate and alkali metal salts of long chain fatty acids having 10 to 20 C-atoms and optionally OH-groups as side groups, may respectively be used as catalysts. The exemplarily mentioned catalysts may be used alone or in mixtures of at leas two of the mentioned catalysts.

Optionally, as adjuvants and/or additives common substances may be used in the process according to the invention. To be mentioned are e.g. surfactants, internal separating agents, fillers, colorants, pigments, flame retardants, protecting agents against hydrolysis, substances having fungi static and/or bacterial static effects, UV-stabilizers and anti oxygens. Pigments and/or colorants may be used in order to obtain toned or colored shaped particles.

In general, the use of a solvent or thinning agent is generally not required for the reaction according to step (3). However, within a preferred embodiment of said reaction, a solvent or a mixture of two or more solvents is used. Suitable solvents are e.g. carbohydrates, particularly toluene, xylene or cyclohexane, esters, particularly ethylglycolacetate, ethylacetate or butyacetate, amides, particularly dimethylformamide or N-methylpyrrolidone, sulfoxides, particularly dimethylsulfoxide, ethers, particularly diisopropylether or methyl-tert.-butyl ether or preferably cyclic ethers, particularly THF or dioxane.

Furthermore, the present invention also relates to a polyurethane, obtainable by an integrated process, comprising at least the following steps, (2) reacting at least one organic compound with at least one alkoxylating agent via a process as described above, wherein a polyether alcohol is obtained;

(3) reacting the polyether alcohol of step (2) with at least one isocyanate.

The polyether alcohol, obtainable according to step (2), which is used for preparing the polyurethane, comprises preferably at least one mixed block of ethylene oxide-propylene oxide-units or a terminal propylene oxide-block or a combination of both.

Furthermore, the present invention relates to a process for preparing a polyurethane foam, starting from a polyurethane, as defined within the present invention, that process comprising at least the following step, (4) foaming the polyurethane as used as a starting material:

The present invention also encompasses the polyurethane foam as such, obtainable by foaming a polyurethane, as obtained by the reaction according to step (3). The polyurethanes according to the present invention are predominantly characterized by their low content of impurities, such as C6-compounds. This renders the polyurethanes according to the invention particularly suitable for the preparation of polyurethane foams, polyurethane cast skins and elastomers.

Among the polyurethane foams preferably polyurethane foams are prepared, which are used in the automotive and furniture industry, such as semi-rigid foams, hard and soft integral foams or RIM (reaction injection moulding)-materials.

Processes for the preparation of polyurethane foams are described in Becker, Braun, "Polyurethanes", Kunststoffhandbuch, vol. 7, Carl Hanser, Munich, 3$^{rd}$ edition, 1993, p. 193 to 265.

In a preferred embodiment, the present invention relates to a polyurethane, which is derived from a polyether alcohol, obtainable according to step (2), which comprises at least one mixed block of ethylene oxide-propylene oxide-units.

The present invention also relates to a polyurethane, derived from a polyether alcohol, obtainable according to step (2), which comprises a terminal propylene oxide block.

The polyurethane according to the present invention, particularly the above-mentioned polyurethane, may suitably be used for preparing shaped bodies, particularly shaped bodies made of soft slab-stock foams on the basis of polyurethane. Particularly advantageous in this respect is the low amount of impurities, which results in that no disturbing smells evolve from the shaped body made of the soft foam.

In addition thereto, the narrower molecular weight distribution due to the lower amount of mono-functional side compounds leads to an improved processing during foaming.

Thus, the present invention also relates to a shaped body comprising a polyurethane or a polyurethane foam, respectively obtainable by the integrated process of the invention.

Shaped bodies according to the invention are e.g. mattresses, pillows, shaped bodies for the automotive industry and upholstery furniture.

The following shaped bodies according to the invention are to be mentioned:
  soft foams, particularly mattresses, shaped bodies for the inner section of cars, such as car seats, sound absorbent shaped bodies, such as e.g. carpets and/or upholstery materials, sponges, cushions, pillows, seating furniture, office furniture, particularly seats, back-rests, orthopedic products;
  thermoplastic polyurethanes, particularly for the use of cables, hoses, animal marks, supports for rails, films, shoe soles and accessories, ski tips and rolled bandages;
  cold casted elastomers, particularly for sheathing of lifting and carrying belts, impact protection elements, industrial edge protectors, toothed belts, screens for abrasive bulk materials, blades, rolls, coatings for rolls, soil protecting sheets against heavy building machines, parts of housings, housings, coatings for deburring drums, pump elements and pump housings, coatings for the outer parts of tubes, coatings for the inner walls of containers, mattresses for cars, cyclones, pulleys for heavy loads, sheave pulleys, guide pulleys, block pulleys, coatings for conveyer belts, coatings for channels, said coatings being resistant against hydrolysis and abrasion, coatings for truck loading areas, impact protectors, clutch parts, coatings for bojen (buoys), inline-skate rolls, special rolls, high impact pump elements;
  soft integral foams, particularly steering wheels, seals for air filters, steering knob, foaming of wires, casings for containers, arm-rests, shoe soles made of polyurethane;
  polyurethane coatings, particularly for floor coverings, refining of materials, such as wood, leather or metal sheets;
  polyurethane skins, particularly for the use as inserts for shaped bodies, such as dashboards, coverings for car doors, truck and car seats, floorings;
  rigid polyurethane foams, particularly for the use as damping material or construction material;
  integral foams, particularly for the use as elements in the inner and outer areas of constructions, complex furnitures, elements for car interiors, skis and snow boards as well as technical functioning parts;
  RIM-foams, particularly for producing prefabricated units for use in the exterior parts in automotive industry, such as extensive facings, fenders and bumpers;
  Thermoformed foams, particularly for preparing ultra-light composite structures for the use in car manufacture, e.g. as an element for roof covers;
  semi-rigid foams, particularly for underfoaming of films, skins or leather or fiber reinforced construction elements.

The invention is now further described by way of the following examples, which are, however, not meant to limit the scope of the present application.

EXAMPLES

FIG. 1 shows a X-ray powder diffractogramm of the MOF-5 catalyst as prepared according to Example 1 (the ordinate Y describes Lin in Counts and the abscisse X the 2-Theta-Scale).

Figure 2:
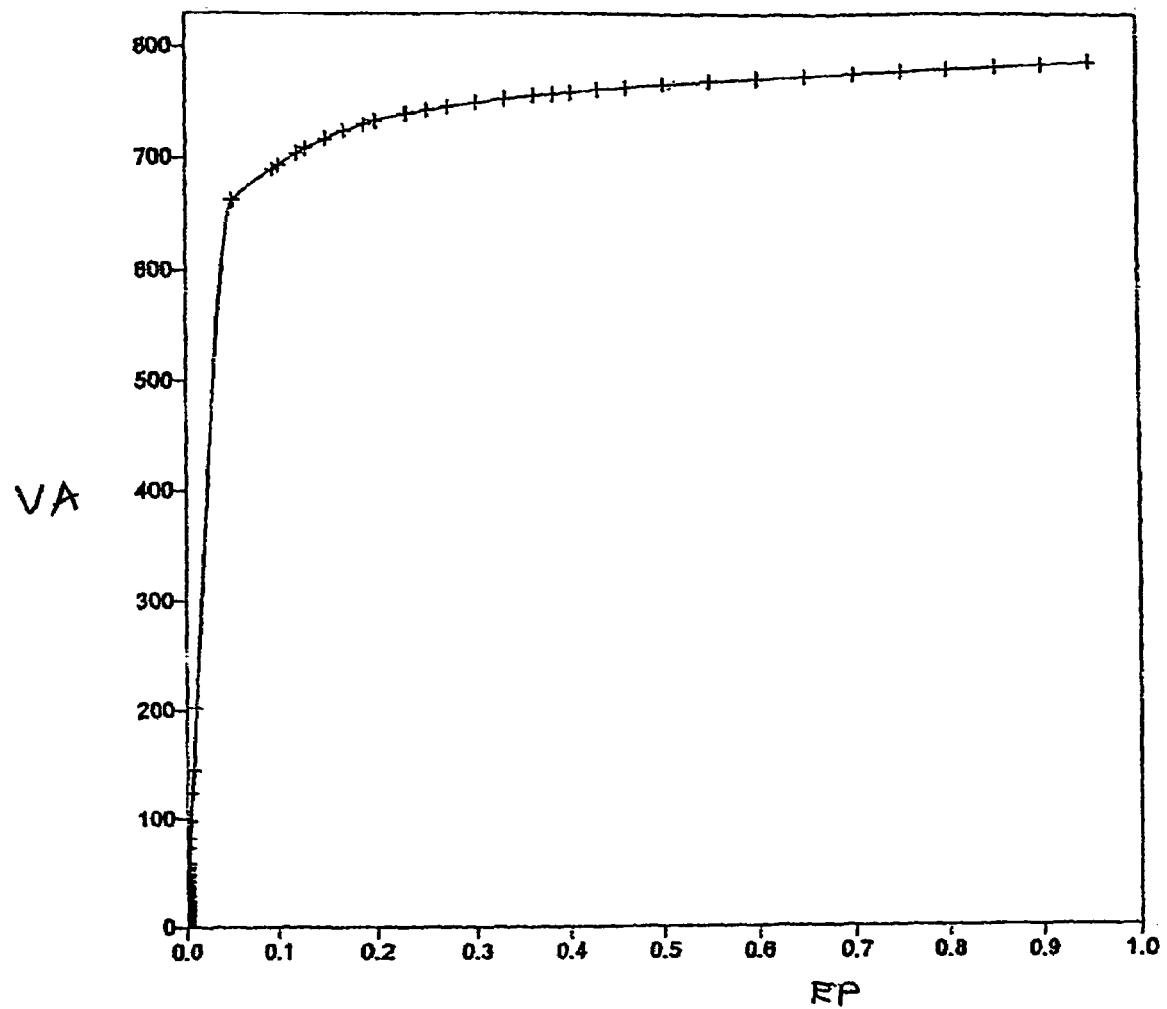
FIG. 2 shows the sorptionisotherme of said catalyst (the ordinate VA describes the volume as absorbed in cm 3/g STP and the abscisse RP the relative pressure (P/PO)).

FIG. 2 shows the sorptionisotherme of said catalyst (the ordinate VA describes the volume as absorbed in cm 3/g STP and the abscisse RP the relative pressure (P/PO)).

Example 1 (Preparation of MOF-5)

| Starting Material | Molar Amount | Calculated | Experimental |
|---|---|---|---|
| terephthalic acid | 12.3 mmol | 2.04 g | 2.04 g |
| Zinc nitrate-tetra hydrate | 36.98 mmol | 9.67 g | 9.68 g |
| diethylformamide (Merck) | 2568.8 mmol | 282.2 g | 282.2 g |

The above-mentioned amounts of the starting materials were dissolved in a beaker in the order diethylformamide, terephthalic acid and zinc nitride. The resulting solution was introduced into two autoclaves (250 ml), having respectively inner walls which were covered by teflon.

The crystallization occurred at 105° C. within twenty hours. Subsequently, the orange solvent was decanted from the yellow crystals, said crystals were again covered by 20 ml dimethylformamide, the latter being again decanted. This procedure was repeated three times. Subsequently, 20 ml chloroform were poured onto the solid, which washed and decanted by said solvent two times.

The crystals (14.4 g), which were still moist, were introduced into a vacuum device and first at room temperature in vacuo ($10^{-4}$ mbar), afterwards dried at 120° C.

Subsequently, the resulting product was characterized by X-ray powder diffraction and an adsorptive determination of micropores. The resulting product shows the X-ray diffractogramm according to FIG. 1, which coincides with MOF-5.

The determination of the sorptionsisotherme, as depicted in FIG. 2, with argon (87K; Micromeritics ASAP 2010) shows an isotherme of type I, being typical for microporous materials, and having a specific surface area of 3020 $m^2/g$, calculated according to Langmuir, and a micropore volume of 0.97 ml/g (at a relative pressure $pp^o = 0{,}4$).

Example 2 (Alkoxylation of Dipropylene Glycol with Propylene Oxide)

Dipropylene glycol (33.5 g corresponding to 0.25 mol) and 0.75 g of the catalyst prepared according to Example 1 were introduced in an autoclave. Subsequently, the autoclave was filled with 116 g propylene oxide (2 mol). The reaction was carried out at 135° C. and a maximum pressure of 12.1 bar, and in total 2.44 mol propylene oxide/mol starting material were reacted to obtain a polyol.

Example 3 (Alkoxylation of Methyl Dipropylene Glycol with Ethylene Oxide)

Methyl dipropylene glycol (30 g corresponding to 0.25 mol) and 0.59 g of the catalyst as prepared according to Example 1 were introduced in an autoclave. The autoclave was then filled with 88 g ethylene oxide (2 mol). The reaction was carried out at 135° C. and a maximum pressure of 21.2 bar. In total, 2.45 mol ethylene oxide/mol starting compound were reacted to obtain a polyol.

Example 4 (Alkoxylation of Acrylic Acid with Ethylene Oxide)

33.2 g acrylic acid (stabilized with 2,2',6,6'-tetramethyl-4-hydroxypiperidine-N-oxide and phenothiazine) and 0.5 g catalyst of Example 1 were weighed into a 300 ml steering autoclave under nitrogen atmosphere. The autoclave was closed and pressurized with 10 bar nitrogen. Upon steering 20 g ethylene oxide were subsequently introduced via a screw press. After five hours at 50° C. the catalyst was filtered off and the raw product was analyzed by gas chromatography. Based on the area percentages the following composition of the solution (residual ethylene oxide not considered):

Acrylic acid 76%, monoethylene glycol acrylate 10%, diethylene glycol acrylate 9%, other side products 5%.

The invention claimed is:

1. A process for the alkoxylation of organic compounds, which comprises:
reacting at least one organic compound, which is capable of being alkoxylated, with at least one alkoxylation agent in the presence of a catalyst system to form a polyether alcohol, wherein the catalyst system comprises a metallo-organic framework material comprising pores and at least one metal ion and at least one at least bidentate organic compound, which is coordinately bounded to said metal ion,
wherein the at least bidentate organic compound is selected from the group consisting of substituted or unsubstituted aromatic polycarboxylic acids, which may comprise one or more nuclei; and substituted or unsubstituted aromatic polycarboxylic acids, which comprise at least one heteroatom and which may have one or more nuclei.

2. A process according to claim 1, wherein the metal ion is selected from the group consisting of elements of groups Ia, IIa, IIIa, IVa to VIIIa and Ib to VIb of the periodic table of the elements.

3. A process according to claim 1, wherein the metallo-organic framework material comprising pores exhibits a specific surface area, as determined via adsorption (BET according to DIN 66131) of larger than 20 m²/g.

4. A process according to claim 1, wherein the alkoxylation agent is selected from the group consisting of mono- or multi-functional epoxides having 2 to 30 carbon atoms and mono- or multi-functional polyetherpolyols having a molar mass of above 600 g/mol and a mixture of two or more thereof.

5. A process for the preparation of a polyurethane comprising:
reacting at least one organic compound, which is capable of being alkoxylated, with at least one alkoxylating agent via a process according to claim 1, to form a polyether alcohol;
reacting the polyether alcohol with at least one isocyanate.

6. A process according to claim 5, wherein the alkoxylating agent is propylene oxide, which has been obtained by reacting propylene with oxygen, hydrogen and oxygen; hydrogen peroxide; organic hydroperoxides; or halohydrins.

7. A process according to claim 6, wherein the propylene oxide has been obtained by reacting propylene with hydrogen peroxide.

8. A process according to claim 6, wherein the propylene oxide has been obtained by reacting propylene with hydrogen peroxide in the presence of a catalyst comprising a zeolitic material.

9. A process according to claim 6, wherein the propylene oxide has been obtained by reacting propylene with hydrogen peroxide in the presence of a catalyst comprising a titanium containing zeolitic material having TS-1 structure.

10. A process according to claim 1, wherein the metal ion is $Co^{2+}$ or $Zn^{2+}$.

11. A process according to claim 1, wherein the at least bidentate organic compound ligand is 1,3,5-benzene tricarboxylic acid.

12. A process according to claim 10, wherein the at least bidentate organic compound ligand is 1,3,5-benzene tricarboxylic acid.

13. A process according to claim 5, wherein the metal ion is $Co^{2+}$ or $Zn^{2+}$.

14. A process according to claim 5, wherein the at least bidentate organic compound ligand is 1,3,5-benzene tricarboxylic acid.

15. A process according to claim 14, wherein the at least bidentate organic compound ligand is 1,3,5-benzene tricarboxylic acid.

* * * * *